US008718103B2

(12) United States Patent
Myung et al.

(10) Patent No.: US 8,718,103 B2
(45) Date of Patent: May 6, 2014

(54) APPARATUS FOR ADJUSTING POLARIZATION CHARACTERISTICS, AND ULTRA-SHORT ULTRA-HIGH INTENSITY PULSE LASER GENERATOR COMPRISING SAME

(75) Inventors: Nam-Soo Myung, Seongnam (KR); Seung-Hwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 42 days.

(21) Appl. No.: 13/634,540

(22) PCT Filed: Mar. 11, 2011

(86) PCT No.: PCT/KR2011/001729
§ 371 (c)(1),
(2), (4) Date: Sep. 12, 2012

(87) PCT Pub. No.: WO2011/112045
PCT Pub. Date: Sep. 15, 2011

(65) Prior Publication Data
US 2013/0003763 A1    Jan. 3, 2013

(30) Foreign Application Priority Data

Mar. 12, 2010  (KR) .................. 10-2010-0022344
Mar. 11, 2011  (KR) .................. 10-2011-0021725

(51) Int. Cl.
*H01S 3/10*    (2006.01)
*H01S 3/00*    (2006.01)
*H01S 3/08*    (2006.01)

(52) U.S. Cl.
CPC .............. *H01S 3/00* (2013.01); *H01S 3/0014* (2013.01); *H01S 3/08054* (2013.01); *H01S 3/10* (2013.01); *H01S 3/10061* (2013.01)
USPC .............. 372/9; 372/25; 372/27; 372/29.023; 372/30; 372/31

(58) Field of Classification Search
CPC ..... H01S 3/00; H01S 3/0014; H01S 3/08054; H01S 3/10; H01S 3/0061
USPC ................................ 372/9, 25, 27, 29.023, 30
See application file for complete search history.

(56) References Cited

U.S. PATENT DOCUMENTS

| 5,832,020 A | 11/1998 | Kong |
| 6,324,189 B1 | 11/2001 | Kim et al. |
| 7,239,392 B2 * | 7/2007 | Chism, II .................. 356/369 |

(Continued)

FOREIGN PATENT DOCUMENTS

| JP | 10-080786 A | 3/1998 |
| JP | 2009-231528 A | 10/2009 |

(Continued)

OTHER PUBLICATIONS

International Search Report for PCT/KR2011/001729 filed on Mar. 11, 2011.

*Primary Examiner* — Dung Nguyen (57) ABSTRACT

The present invention relates to an apparatus for generating an ultra-short ultra-high intensity pulse laser, comprising: a pulse laser providing unit which generates an ultra-short ultra-high intensity pulse laser, stretches pulse width, then selects and provides only a pulse laser having a predetermined polarizing angle; a polarization characteristic adjusting unit which divides the pulse laser provided by the pulse laser providing unit into S-polarizing component light and P-polarizing component light, varies the phase difference and amplitude difference between the S-polarizing component light and the P-polarizing component light, and combines the two types of light to generate a pulse laser with varied polarization characteristics; and a pulse compression unit which compresses the pulse width of the pulse laser, the polarization characteristics of which are varied by the polarization characteristic adjusting unit, and outputs the pulse laser.

9 Claims, 5 Drawing Sheets

(56) References Cited

U.S. PATENT DOCUMENTS

| | | | |
|---|---|---|---|
| 8,184,992 B2 * | 5/2012 | Kikuchi | 398/202 |
| 2005/0243877 A1 | 11/2005 | Schuhmacher et al. | |
| 2009/0122317 A1 * | 5/2009 | Ito et al. | 356/440 |
| 2009/0238223 A1 | 9/2009 | Kawakami et al. | |

FOREIGN PATENT DOCUMENTS

| | | |
|---|---|---|
| KR | 10-1997-0008747 A | 2/1997 |
| KR | 10-2001-0057751 A | 7/2001 |
| KR | 10-2002-0022162 A | 3/2002 |

* cited by examiner

APPARATUS FOR ADJUSTING POLARIZATION CHARACTERISTICS, AND ULTRA-SHORT ULTRA-HIGH INTENSITY PULSE LASER GENERATOR COMPRISING SAME

TECHNICAL FIELD

The present invention relates to an ultra-short, ultra high-intensity pulse laser generator and, more particularly, to a polarization characteristics (or polarization properties) controlling apparatus capable of arbitrarily controlling polarization characteristics of a pulse laser, and an ultra-short, ultra high-intensity pulse laser generator including the same.

BACKGROUND ART

An ultra-short ultra high-intensity pulse laser generator generates a linearly polarized pulse laser based on a mode locking technique and amplifies the generated pulse laser several times to obtain ultra high-intensity pulses. In this case, however, the linearly polarized pulse laser has an instantly high maximum output value, potentially damaging an optical device due to an electromagnetic field of the linearly polarized pulse laser.

In an effort to solve the problem, a Chirped Pulse Amplification (CPA) technique has been proposed. A laser generator based on the CPA technique, which includes an ultra-short, ultra high-intensity pulse laser oscillator, a pulse stretcher, amplifiers, and a pulse compressor, varies pulses of an ultra-short, ultra high-intensity pulse laser into temporally long pulses, amplifies the same, and subsequently returns them to the original pulse width. When the pulses of the ultra-short ultra high-intensity pulse laser are varied into temporally long pulses and amplified, the strength thereof is reduced, while the energy thereof is maintained as it is, and thus, the pulses can be amplified without damaging an amplifying medium.

Here, the laser generator based on the CPA basically uses linearly polarized light, due to the fact that the processes of generating, amplifying, stretching, compressing, and the like, of laser pulses in the laser generator, are generally designed to be optimized to use linearly polarized light.

A pulse stretcher and a pulse compressor respectively stretch and compress a pulse width by using a change in the speed of light according to a wavelength thereof, namely, a change in a length of a path (or an optical dispersion) using a change in a refractive index of light according to a wavelength of light generated when light passes through a medium. Also, in the case of correcting an error occurring as light passes through a medium, an increased pulsed width is corrected by varying a path of light according to a wavelength thereof. To this end, a mirror, a lens, a prism, a grating, and other elements, may be used, and here, such an optical device is also designed to use light linearly polarized in a particular direction.

Meanwhile, in order to convert linearly polarized light into circularly polarized light, a birefringent medium (which has birefringence and allows a speed of light to be varied according to an angle of linearly polarized light) is commonly used. In order to rotate a direction of linearly polarized light, a Faraday rotator is occasionally used by using magnetic characteristics of a medium.

When light passes through a pockels cell by using a birefringent medium according to an electrical signal applied from the outside, the pockels cell rotates to an angle of the linearly polarized light by 0°, 90°, 180°, or the like.

Crystal structures of the birefringent medium are not uniform according to an arrangement direction of the medium, and a refractive index of light may vary according to a wavelength thereof, depending on a direction in which light moves, a relationship with a polarizing angle, and an arrangement of a crystal structure. Further, a refractive index varies according to a relationship between an angle of linearly polarized light and a crystal structure. Namely, when light passes through such a medium, the speed thereof is varied, according to a direction of polarized light.

When linearly polarized light is intended to be converted into circularly polarized light, linearly polarized light is made incident at an angle of 45° with respect to a characteristic axis of the medium. The incident light is then disintegrated into two characteristically polarized light beams (characteristic polarization) within the medium, and thusly disintegrated linearly polarized light beams proceed at different speeds. The two linearly polarized light beams are combined at a rear surface of the medium upon passing through the medium, and at this time, when a phase difference of the two polarized light beams is 90°, they form circularly polarized light. When the phase difference of the circularly polarized light beams is +/−90°, an electric field is rotated horizontally relative to a movement axis, and this is known as left-circularly and right-circularly polarized light.

A birefringent optical device making a phase difference of linearly polarized light +/−90° is called a ¼ wave plate (or a quarter wave plate), and this plate may be easily damaged by an ultra-short, ultra high-intensity pulse laser, has severe optical dispersion, in particular, severe polarization dependent dispersion, so it is not easy to generate a circularly polarized pulse laser having an ultra-short ultra high-intensity pulse width. Of course, it is also not easy to convert linearly polarized light into an oval polarized light pulse laser.

Namely, according to the related art, polarization characteristics of a linearly polarized pulse laser cannot be controlled arbitrarily.

DISCLOSURE OF INVENTION

Technical Problem

An aspect of the present invention provides a polarization characteristics controlling apparatus capable of arbitrarily controlling polarization characteristics of a linearly polarized pulse laser.

Another aspect of the present invention provides an ultra-short ultra high-intensity pulse laser generator capable of controlling even p polarization characteristics of an ultra-short ultra high-intensity pulse laser by using the polarization characteristics controlling apparatus.

Technical Solution

According to an aspect of the present invention, there is provided an ultra-short ultra high-intensity pulse laser generating apparatus including: a pulse laser providing unit generating ultra-short ultra high-intensity pulse lasers, stretching a pulse width of each of the pulse lasers, and selectively providing a pulse laser having a pre-set polarization angle; a polarization characteristics controlling unit splitting the pulse laser provided from the pulse laser providing unit into S polarized component light and P polarized component light, varying a phase difference and an amplitude difference between the S polarized component light and the P polarized component light, and optically coupling the S polarized component light and the P polarized component light to generate a pulse laser having varied polarization characteristics; and a pulse compressing unit compressing a pulse width of the pulse laser having the polarization characteristics varied by the polarization characteristics controlling unit and outputting the same.

The polarization characteristics controlling unit may include: a polarized beam splitter splitting the pulse laser provided from the pulse laser providing unit into S polarized component light and P polarized component light; first and second mirrors varying a length of an optical transmission path to vary a phase difference between the S polarized component light and the P polarized component light; first and second amplifying units varying an amplitude difference between the S polarized component light and the P polarized component light by varying a degree of light amplification; and a polarized beam coupling unit optically coupling the S polarized component light and the P polarized component light input through the first and second mirrors and the first and second amplifying units and generating and outputting a pulse laser having varied polarization characteristics.

The apparatus may further include: a controller determining the phase difference and the amplitude difference between the S polarized component light and the P polarized component light according to target polarization characteristics, and informing the polarization characteristics controlling unit of the determined phase difference and the amplitude difference.

The target polarization characteristics may be one of left-circularly polarized light characteristics, right-circularly polarized light characteristics, left-ovally polarized light characteristics, right-ovally polarized light characteristics, vertical linearly polarized light characteristics, and horizontal linearly polarized light characteristics.

The apparatus may further include: a monitoring unit monitoring a state of the pulse laser output through the polarization characteristics controlling unit or the pulse compression unit.

The controller may further have a function of calculating a correction value for canceling a wave-front error and a polarization characteristics error based on the monitoring results from the monitoring unit, and informing the polarization characteristics controlling unit of the calculated correction value.

According to another aspect of the present invention, there is provided a pulse laser generating apparatus including: a polarized beam splitter splitting a linearly polarized pulse laser into S polarized component light and P polarized component light; a polarized component controlling unit varying a phase difference and an amplitude difference between the S polarized component light and P polarized component light according to target polarization characteristics; and a polarized beam coupling unit optically coupling the S polarized component light and the P polarized component light having the phase difference and amplitude difference varied through the polarized component controlling unit, and generating a pulse laser having the target polarization characteristics.

The polarized component controlling unit may include: first and second mirrors varying a phase difference between the S polarized component light and the P polarized component light by varying a length of an optical transmission path; and first and second amplifying units varying an amplitude difference between the S polarized component light and the P polarized component light by varying a degree of light amplification.

The target polarization characteristics may be one of left-circularly polarized light characteristics, right-circularly polarized light characteristics, left-ovally polarized light characteristics, right-ovally polarized light characteristics, vertical linearly polarized light characteristics, and horizontal linearly polarized light characteristics.

Advantageous Effects

According to embodiments of the invention, in the pulse laser generating apparatus according to another embodiment of the present invention, a linearly polarized pulse laser is split into S polarized component light and P polarized component light, and a phase difference and an amplitude difference between S polarized component light and P polarized component light are adjusted to variably vary polarization characteristics of the pulse laser.

In addition, the pulse laser generating apparatus according to another embodiment of the present invention generates a linearly polarized pulse laser by using a CPA technique and outputs a pulse laser having varied polarization characteristics, and thus, the pulse laser generating apparatus according to another embodiment of the present invention can be easily applied to a laser generator based on the CPA technique.

BEST MODE FOR CARRYING OUT THE INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

For reference, in the case that an ultra-short ultra high-intensity pulse laser is focused on a thin film material, when a power density exceeds 1019~1020 W/cm2, the thin film develops a plasma state in which electrons and ions are separated, according to interaction between the laser and the thin film material. The separated electrons are accelerated in a movement direction of the laser at a speed as fast as light by the laser, but ions which have a mass greater than electrons and are heavy are accelerated slowly behind the electrons. Through such a space charge separation, a large electric field is formed between the electrons and the ions, and the ions can be accelerated by the electric field. In this case, acceleration of light particles reaches a radiation pressure acceleration region accelerated in the direction of light movement, regardless of an electrical charge of the particles.

In the case of using circularly polarized light, a low energy distribution of particles (mono-energetic beam), a low divergence angle (highly focused and collimated beam), and high energy conversion efficiency (conversion from optical energy into particle kinetic energy) owing to a formation of a magnetic field by circularly polarized light are anticipated as effects of particle acceleration by the ultra-short ultra high-intensity pulse laser, in comparison to the case of using linearly polarized light.

Figure 1:
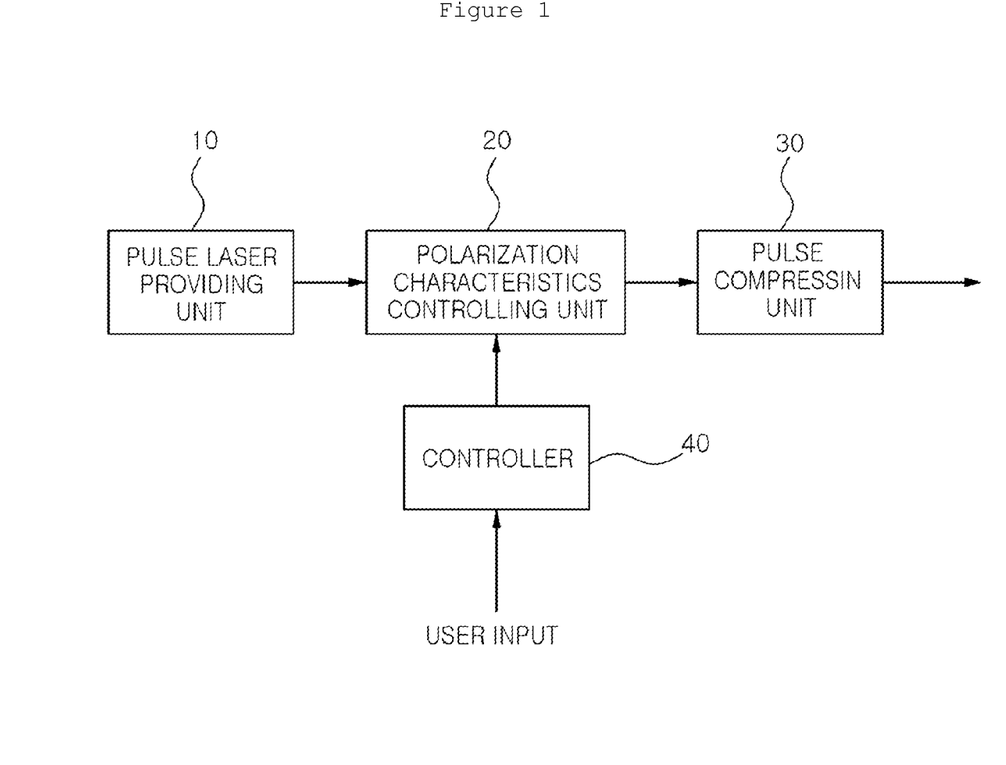
FIG. 1 is a block diagram of a pulse laser generating apparatus according to an embodiment of the present invention.

FIG. 1 is a block diagram of a pulse laser generating apparatus according to an embodiment of the present invention.

Referring to FIG. 1, a pulse laser generating apparatus according to an embodiment of the present invention may include a pulse laser providing unit 10 generating ultra-short ultra high-intensity pulse lasers, stretching a pulse width of each of the pulse lasers, and selectively providing a pulse laser having a pre-set polarization angle (i.e., a linearly polarized pulse laser), a polarization characteristics controlling unit 20 splitting the linearly polarized pulse laser into S polarized component light and P polarized component light, varying a phase difference and an amplitude difference between the S polarized component light and the P polarized component light, and optically coupling the S polarized component light and the P polarized component light to generate a pulse laser having varied polarization characteristics, a pulse compressing unit 30 compressing a pulse width of each of the pulse laser having the varied polarization characteristics and outputting the same, a controller 40 determining a phase difference and an amplitude difference between the S polarized component light and the P polarized component light, and informing the polarization characteristics controlling unit 20 of the determined phase difference and the amplitude difference, and the like.

First, the controller 40 recognizes polarization characteristics (hereinafter, referred to as 'target polarization characteristics') required by a user, determines a phase difference and an amplitude difference between S polarized component light and P polarized component light, and informs the polarization characteristics controlling unit 20 accordingly.

In this state, the pulse laser providing unit 10 stretches a pulse width of each of ultra-short ultra high-intensity pulse lasers through a CPA technique, selectively outputs only a pulse laser having a pre-set polarization angle (namely, a linearly polarized pulse laser). The polarization characteristics controlling unit 20 splits the pulse laser into S polarized component light and P polarized component light.

Thereafter, when the polarization characteristics controlling unit 20 transmits the S polarized component light and P polarized component light, it varies a potential difference and an amplitude difference thereof into values informed by the controller 40 and subsequently optically couples them.

The optically coupled pulse laser has target polarization characteristics, and the reason is because polarization characteristics of the pulse laser can be varied according to the phase difference and the amplitude difference between the two mutually perpendicular linear polarized light beams (namely, the S polarized component light and P polarized component light) according to a superposition principle.

Finally, the pulse compressing unit 30 compresses the pulse width of the pulse laser having the target polarization characteristics to restore it to an ultra-short ultra high-intensity pulse laser form.

Figure 2:
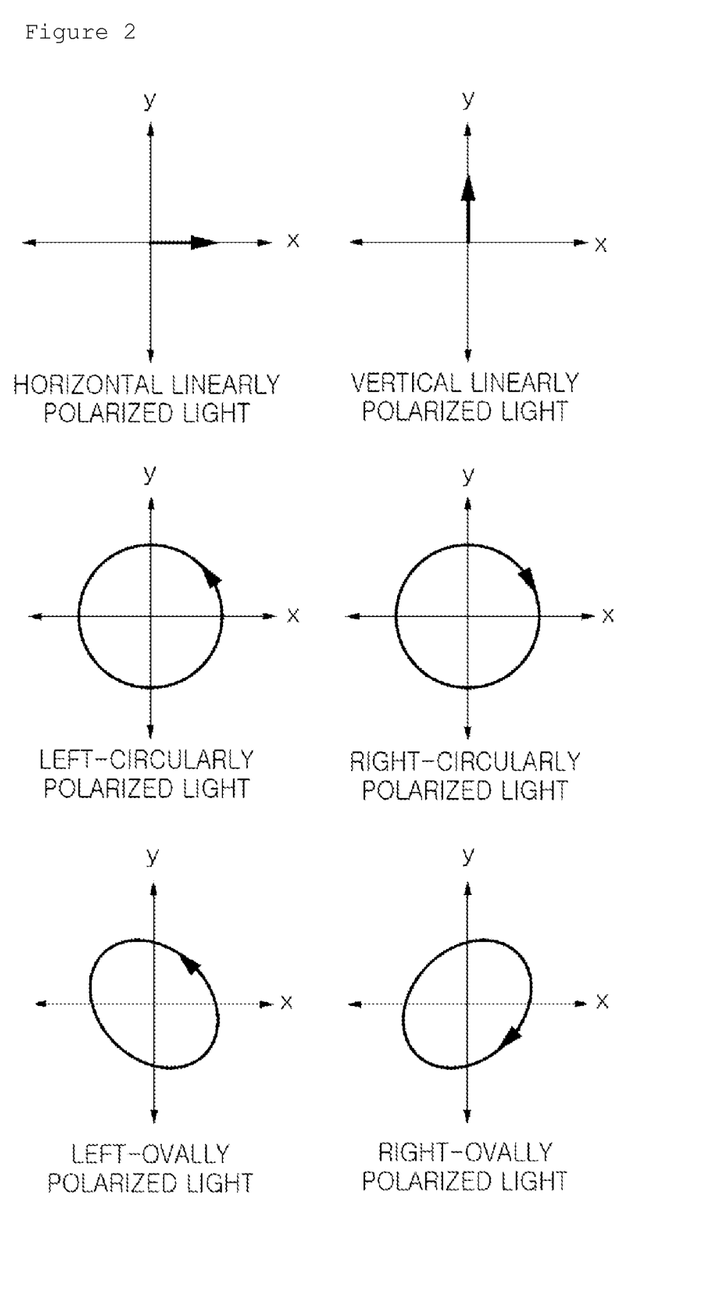
FIG. 2 is a detailed block diagram of the pulse laser providing unit according to an embodiment of the present invention.

FIG. 2 is a view illustrating polarization characteristics of a pulse laser that may be generated by the polarization characteristics controlling unit according to an embodiment of the present invention.

Referring to FIG. 2, it can be seen that, the polarization characteristics controlling unit 20 may split a linearly polarized pulse laser into two linearly polarized light beams which are perpendicular to each other, and vary a phase difference and an amplitude difference thereof, thus varying polarization characteristics of the output pulse laser into left-circularly polarized light characteristics, right-circularly polarized light characteristics, left-ovally polarized light characteristics, right-ovally polarized light characteristics, linearly polarized light characteristics (vertical-horizontal, horizontal-vertical), and the like.

For example, a linearly polarized pulse laser may be varied into a left-circularly or right-circularly polarized pulse laser by varying a phase difference between two linearly polarized light beams, i.e., S polarized component light and P polarized component light, into '½ wavelength' or '−¼ wavelength' while maintaining an amplitude difference therebetween as '0'. Also, the linearly polarized pulse laser may be varied into a left-ovally or right-ovally polarized pulse laser by varying both an amplitude and a phase of each of the S polarized component light and the P polarized component light. Also, a vertical linearly polarized pulse laser may be varied into a horizontal linearly polarized pulse laser or a horizontal linearly polarized pulse laser may be varied into a vertical linearly polarized pulse laser by only controlling the amplitude while maintaining the phases of the S polarized component light and the P polarized component light as the same value.

Figure 3:
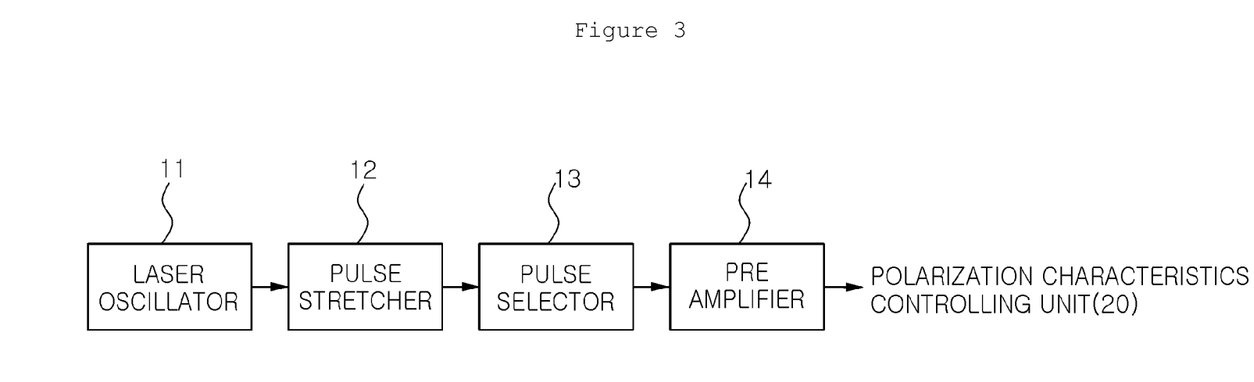
FIG. 3 is a detailed block diagram of a polarization characteristics controlling unit according to an embodiment of the present invention.

FIG. 3 is a detailed block diagram of the pulse laser providing unit 10 according to an embodiment of the present invention;

Referring to FIG. 3, the pulse laser providing unit 10 may include a laser oscillator 11, a pulse stretcher 12, a pulse selector 13, a pre-amplifier 14, and the like.

The laser oscillator 11 generates an ultra-short ultra high-intensity pulse laser by using a mode locking technique.

The pulse stretcher 12 temporally stretches a pulse width of the ultra-short ultra high-intensity pulse laser generated by the laser generator 11 to lower a signal value of the pulse laser.

The pulse selector 13 selectively outputs only a pulse laser having a particular polarization angle (namely, only a linearly polarized pulse laser) among pulse lasers having a pulse width stretched by the pulse stretcher 12.

The pre-amplifier 14 primarily amplifies the linearly polarized pulse laser selected by the pulse selector 13 and provides the same to the polarization characteristics controlling unit 20.

Namely, the pulse laser providing unit 10 generates an ultra-short ultra high-intensity pulse laser by using the CPA technique, stretches a pulse width thereof, and selectively outputs a particular linearly polarized pulse laser.

Figure 4:
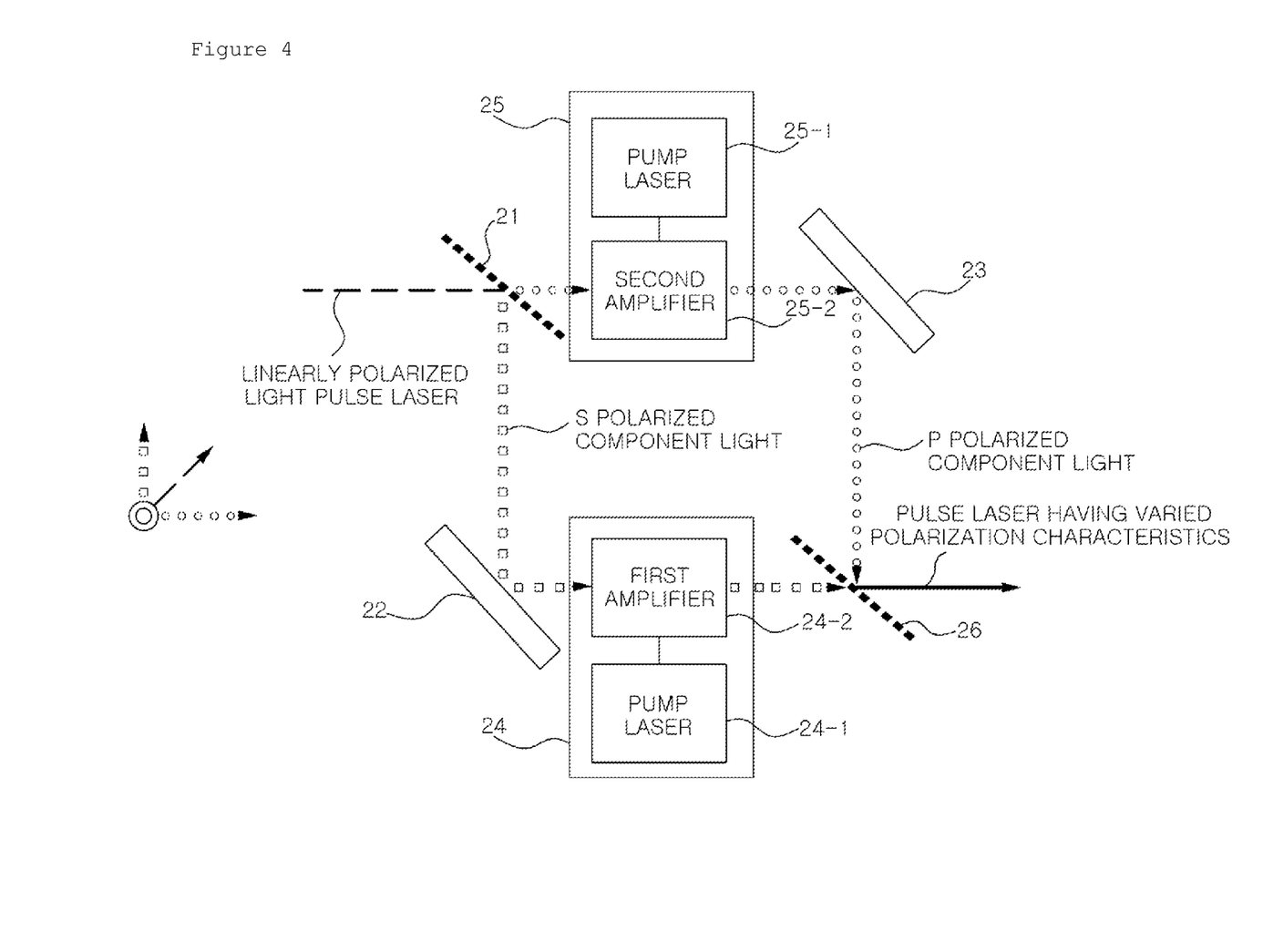
FIG. 4 is a view illustrating polarization characteristics of a pulse laser that may be generated by the polarization characteristics controlling unit according to an embodiment of the present invention.

FIG. 4 is a detailed block diagram of the polarization characteristics controlling unit 20 according to an embodiment of the present invention.

Referring to FIG. 4, the polarization characteristics controlling unit 20 according to an embodiment of the present invention may include a polarized beam splitter 21, first and second mirrors 22 and 23, first and second amplifying units 24 and 25, a polarized beam coupling unit 26, and the like.

The polarized beam splitter 21 splits a linearly polarized pulse laser input through the pre-amplifier 14 into S polarized component light and P polarized component light. The first and second mirrors 22 and 23 reflect the S polarized component light and the P polarized component light split by the polarized beam splitter 21 to the polarized beam coupling unit 26, respectively, and vary a length of an optical transmission path under the control of the controller 40 to control a phase difference between the S polarized component light and the P polarized component light. Here, the length of the optical transmission path by the first and second mirrors 22 and 23 may be controlled by adjusting dispositions of the first and second mirrors 22 and 23, angles of the mirrors 22 and 23, and the like. The first and second amplifying units 24 and 25 include pump lasers 24-1 and 25-1 generating a pumping laser and amplifiers 24-2 and 25-2 amplifying the S polarized component light by using the pumping laser, respectively. The first and second amplifying units 24 and 25 adjust an amplitude difference between the S polarized component light and the P polarized component light by varying a degree of amplification of the amplifiers 24-2 and 25-2 under the control of the controller 40, respectively.

The polarized beam coupling unit 26 receives the S polarized component light and the P polarized component light having the phase difference and the amplitude difference varied by the first and second mirrors 22 and 23 and the first and second amplifying units 24 and 25, and optically couples them to generate a pulse laser having target polarization characteristics.

In this manner, the polarization characteristics controlling unit 20 splits the linearly polarized pulse laser into the mutually perpendicular S polarized component light and P polarized component light, controls the phase difference and the amplitude difference between the S polarized component light and the P polarized component light, and subsequently optically couples them, thus varying the polarization characteristics of the pulse laser as shown in FIG. 2.

Figure 5:
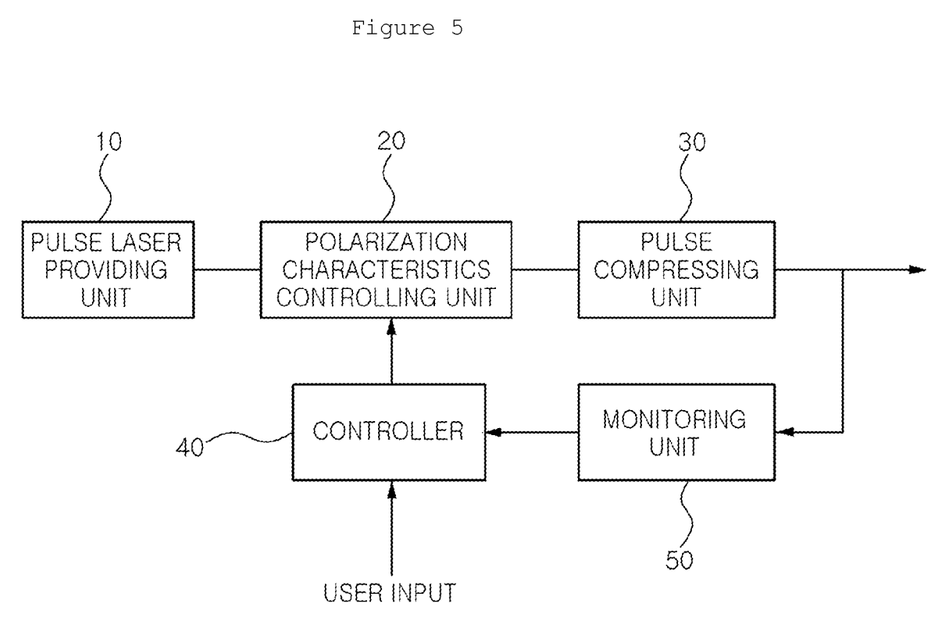
FIG. 5 is a block diagram of a pulse laser generating apparatus according to another embodiment of the present invention.

In addition, in an embodiment of the present invention, in order to increase signal quality of a pulse laser, a pulse laser generating apparatus may be configured as illustrated in FIG. 5.

FIG. 5 is a block diagram of a pulse laser generating apparatus according to another embodiment of the present invention.

Referring to FIG. 5, unlike the pulse laser generating apparatus illustrated in FIG. 1, the pulse laser generating apparatus according to the present embodiment of the present invention may further include a monitoring unit 50 for monitoring an output state (e.g., a wave-front error, a space distribution error, a polarization dependence dispersion, and the like) by using various types of sensors, a spectrum analyzer, and the like.

The controller 40 may additionally perform a function of calculating a correction value for canceling the wave-front error, the space distribution error, the polarization dependence dispersion, and the like, based on the monitoring results from the monitoring unit 50, and informing the polarization characteristics controlling unit 20 of the calculated correction value.

Namely, when it is detected that a wave-front error has occurred through the monitoring unit 50, the controller 40 may cancel the wave-front error by varying a refractive index, and the like, of the first mirror 22 and/or the second mirror 23. Also, when it is detected that the polarization characteristics (a space distribution error, polarization dependence dispersion, and the like) have an error, the controller 40 may cancel the error of the polarization characteristics by adjusting the degree of amplification of the first amplifying unit 24 and/or the second amplifying unit 25.

As a result, the pulse laser generating apparatus according to another embodiment of the present invention can cancel an error such as a wave-front error, a space distribution error, a polarization dependence dispersion, and the like, as well as varying polarization characteristics of a pulse laser.

While the present invention has been shown and described in connection with the embodiments, it will be apparent to those skilled in the art that modifications and variations can be made without departing from the spirit and scope of the invention as defined by the appended claims.

The invention claimed is:

1. An ultra-short ultra high-intensity pulse laser generating apparatus comprising:
    a pulse laser providing unit generating ultra-short ultra high-intensity pulse lasers, stretching a pulse width of each of the pulse lasers, and selectively providing a laser pulse having a pre-set polarization angle;
    a polarization characteristics controlling unit splitting the laser pulse provided from the pulse laser providing unit into S polarized component light and P polarized component light, varying a phase difference and an amplitude difference between the S polarized component light and the P polarized component light, and optically coupling the S polarized component light and the P polarized component light to generate a laser pulse having varied polarization characteristics; and
    a pulse compressing unit compressing a pulse width of the laser pulse having the polarization characteristics varied by the polarization characteristics controlling unit and outputting the laser pulse.

2. The ultra-short ultra high-intensity pulse laser generating apparatus of claim 1, wherein the polarization characteristics controlling unit comprises:
    a polarized beam splitter splitting the laser pulse provided from the pulse laser providing unit into S polarized component light and P polarized component light;
    first and second mirrors varying a length of an optical transmission path to vary a phase difference between the S polarized component light and the P polarized component light;
    first and second amplifying units varying an amplitude difference between the S polarized component light and the P polarized component light by varying a degree of light amplification; and
    a polarized beam coupling unit optically coupling the S polarized component light and the P polarized component light input through the first and second mirrors and the first and second amplifying units and generating and outputting a laser pulse having varied polarization characteristics.

3. The ultra-short ultra high-intensity pulse laser generating apparatus of claim 2, further comprising a controller determining the phase difference and the amplitude difference between the S polarized component light and the P polarized component light according to target polarization characteristics, and informing the polarization characteristics controlling unit of the determined phase difference and the amplitude difference.

4. The ultra-short ultra high-intensity pulse laser generating apparatus of claim 3, wherein the target polarization characteristics are one of left-circularly polarized light characteristics, right-circularly polarized light characteristics, left-ovally polarized light characteristics, right-ovally polarized light characteristics, vertical linearly polarized light characteristics, and horizontal linearly polarized light characteristics.

5. The ultra-short ultra high-intensity pulse laser generating apparatus of claim 3, further comprising a monitoring unit monitoring a state of the pulse laser output through the polarization characteristics controlling unit or the pulse compression unit.

6. The ultra-short ultra high-intensity pulse laser generating apparatus of claim 5, wherein the controller further has a function of calculating a correction value for canceling a wave-front error and a polarization characteristics error based on the monitoring results from the monitoring unit, and informing the polarization characteristics controlling unit of the calculated correction value.

7. A pulse laser generating apparatus comprising:
   a polarized beam splitter splitting a linearly polarized pulse laser into S polarized component light and P polarized component light;
   a polarized component controlling unit varying a phase difference and an amplitude difference between the S polarized component light and P polarized component light according to target polarization characteristics; and
   a polarized beam coupling unit optically coupling the S polarized component light and the P polarized component light having the phase difference and amplitude difference varied through the polarized component controlling unit, and generating a laser pulse having the target polarization characteristics.

8. The pulse laser generating apparatus of claim 7, wherein the polarized component controlling unit comprises:
   first and second mirrors varying a phase difference between the S polarized component light and the P polarized component light by varying a length of an optical transmission path; and
   first and second amplifying units varying an amplitude difference between the S polarized component light and the P polarized component light by varying a degree of light amplification.

9. The pulse laser generating apparatus of claim 7, wherein the target polarization characteristics are one of left-circularly polarized light characteristics, right-circularly polarized light characteristics, left-ovally polarized light characteristics, right-ovally polarized light characteristics, vertical linearly polarized light characteristics, and horizontal linearly polarized light characteristics.

* * * * *